(12) United States Patent
Li et al.

(10) Patent No.: US 11,019,648 B2
(45) Date of Patent: May 25, 2021

(54) GROUP COMMUNICATION METHOD AND APPARATUS

(71) Applicant: Huawei Technologies Co., Ltd., Shenzhen (CN)

(72) Inventors: Bingzhao Li, Beijing (CN); Yongqiang Gao, Beijing (CN); Jian Zhang, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/582,410

(22) Filed: Apr. 28, 2017

(65) Prior Publication Data

US 2017/0238336 A1 Aug. 17, 2017

Related U.S. Application Data

(63) Continuation of application No. PCT/CN2014/090093, filed on Oct. 31, 2014.

(51) Int. Cl.
*H04W 72/12* (2009.01)
*H04W 4/06* (2009.01)
(Continued)

(52) U.S. Cl.
CPC ......... *H04W 72/1273* (2013.01); *H04W 4/06* (2013.01); *H04W 8/18* (2013.01);
(Continued)

(58) Field of Classification Search
None
See application file for complete search history.

(56) References Cited

U.S. PATENT DOCUMENTS

| 2005/0090278 A1* | 4/2005 | Jeong | H04W 36/0055 |
| | | | 455/525 |
| 2005/0177620 A1* | 8/2005 | Lee | H04W 36/0007 |
| | | | 709/204 |

(Continued)

FOREIGN PATENT DOCUMENTS

| CN | 1759629 A | 4/2006 |
| CN | 101400188 A | 4/2009 |

(Continued)

OTHER PUBLICATIONS

"eMBMS Stage 2 description for release 9," 3GPP TSG-RAN3 Meeting #63bis, Seoul, Korea, R3-090800, 3rd Generation Partnership Project, Valbonne, France (Mar. 23-26, 2009).

(Continued)

*Primary Examiner* — Bob A Phunkulh
(74) *Attorney, Agent, or Firm* — Leydig, Voit & Mayer, Ltd.

(57) ABSTRACT

Embodiments of the present invention provide a group communication method and an apparatus. A base station is provided, including: a processor, configured to determine to start scheduling PTM transmission in a first cell, where the scheduling PTM transmission is used to enable UE in the first cell to receive data on a scheduling PTM transmission resource; and a transmitter, configured to: send configuration information of the scheduling PTM transmission to the UE in the first cell, where the configuration information is used to enable the UE in the first cell to receive data according to an indication of the configuration information; and send, on the scheduling PTM transmission resource, data according to the indication of the configuration information.

14 Claims, 7 Drawing Sheets

(51) Int. Cl.
*H04W 36/00* (2009.01)
*H04W 8/18* (2009.01)
*H04W 72/00* (2009.01)

(52) U.S. Cl.
CPC ... *H04W 36/0007* (2018.08); *H04W 36/0009* (2018.08); *H04W 72/005* (2013.01); *H04W 72/1289* (2013.01); *H04W 72/121* (2013.01)

(56) References Cited

U.S. PATENT DOCUMENTS

| | | | | |
|---|---|---|---|---|
| 2006/0068793 A1* | 3/2006 | Van Lieshout | ..... | H04W 72/005 455/444 |
| 2006/0079239 A1* | 4/2006 | Kwak | ..... | H04W 72/005 455/447 |
| 2008/0112352 A1* | 5/2008 | Kuo | ..... | H04W 36/22 370/312 |
| 2009/0036140 A1 | 2/2009 | Yahagi | | |
| 2009/0305712 A1* | 12/2009 | Franceschini | ..... | H04W 52/08 455/450 |
| 2010/0232340 A1* | 9/2010 | Godor | ..... | H04H 20/57 370/312 |
| 2010/0254360 A1* | 10/2010 | Ueda | ..... | H04W 48/12 370/338 |
| 2010/0272004 A1* | 10/2010 | Maeda | ..... | H04L 5/0007 370/312 |
| 2011/0230216 A1 | 9/2011 | Amirijoo et al. | | |
| 2011/0243054 A1* | 10/2011 | Yi | ..... | H04W 72/121 370/312 |
| 2012/0127913 A1* | 5/2012 | Lin | ..... | H04W 68/00 370/312 |
| 2012/0202493 A1* | 8/2012 | Wang | ..... | H04W 60/00 455/435.1 |
| 2012/0213142 A1* | 8/2012 | Van Lieshout | ..... | H04W 72/121 370/312 |
| 2012/0236776 A1* | 9/2012 | Zhang | ..... | H04W 48/12 370/312 |
| 2013/0039248 A1* | 2/2013 | Koskinen | ..... | H04W 72/005 370/312 |
| 2013/0155871 A1 | 6/2013 | Zhu et al. | | |
| 2013/0301509 A1* | 11/2013 | Purnadi | ..... | H04L 65/4076 370/312 |
| 2013/0324129 A1* | 12/2013 | Lee | ..... | H04W 4/06 455/436 |
| 2014/0031038 A1* | 1/2014 | Wang | ..... | H04W 36/26 455/436 |
| 2014/0036676 A1* | 2/2014 | Purnadi | ..... | H04W 36/0055 370/235 |
| 2014/0119265 A1* | 5/2014 | Shauh | ..... | H04W 4/06 370/312 |
| 2014/0258962 A1 | 9/2014 | Ho et al. | | |
| 2014/0269566 A1 | 9/2014 | Wang et al. | | |
| 2014/0286225 A1* | 9/2014 | Yu | ..... | H04W 4/08 370/312 |
| 2015/0131510 A1* | 5/2015 | Gilbert | ..... | H04W 72/005 370/312 |
| 2016/0242216 A1* | 8/2016 | Zhao | ..... | H04L 12/1886 |
| 2016/0249183 A1* | 8/2016 | Kim | ..... | H04W 4/06 |
| 2016/0249266 A1* | 8/2016 | Kim | ..... | H04W 4/06 |

FOREIGN PATENT DOCUMENTS

| | | |
|---|---|---|
| CN | 101529932 A | 9/2009 |
| CN | 102056342 A | 5/2011 |
| CN | 102387471 A | 3/2012 |
| EP | 1507423 A1 | 2/2005 |
| EP | 1986449 B1 | 6/2012 |
| JP | 2014529936 A | 11/2014 |
| WO | 2013024334 A1 | 2/2013 |

OTHER PUBLICATIONS

"3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 12)," 3GPP TS 36300 V12.3.0 3rd Generation Partnership Project, Valbonne, France (Sep. 2014).

"Consideration on resource efficiency of Group communication over eMBMS", 3GPP TSG-RAN WG2 #85 R2-140222, 3rd Generation Partnership Project, Valbonne, France (Feb. 2014).

"3$^{rd}$ Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V12.3.0, pp. 1-378, 3$^{rd}$ Generation Partnership Project, Valbonne, France (Sep. 2014).

"3$^{rd}$ Generation Partnership Project; Technical Specification Group Radio Access Network; Evolved Universal Terrestrial Radio Access Network (E-UTRAN); M2 Application Protocol (M2AP) (Release 12)," 3GPP TS 36.443, V12.0.0, pp. 1-84, 3$^{rd}$ Generation Partnership Project, Valbonne, France (Sep. 2014).

* cited by examiner

GROUP COMMUNICATION METHOD AND APPARATUS

CROSS-REFERENCE TO RELATED APPLICATIONS

This application is a continuation of International Patent Application No. PCT/CN2014/090093, filed on Oct. 31, 2014, the disclosure of which is hereby incorporated by reference in its entirety.

TECHNICAL FIELD

Embodiments of the present invention relate to the field of wireless communications technologies, and in particular, to a group communication method and an apparatus.

BACKGROUND

Group communication refers to a mechanism in which multiple user equipments (User Equipment, UE) are used as a group to perform communication. A characteristic of the group communication is that multiple UEs in a group may receive same data at the same time.

In current voice communication, group communication is generally performed by using a group communication server, each UE in the group establishes a signaling connection and a voice connection to the group communication server. By using the signaling connection to the UE, the group communication server controls UE that can send an uplink voice, and sends the received uplink voice to another UE in the group. However, in the group communication of the voice communication, each UE needs a separate downlink voice channel on an access network side. Although downlink voices received by multiple UEs in the group are the same, a piece of downlink voice data still needs to be separately sent to each UE, wasting radio resources on the access network side.

On the other hand, in wireless communication, there is also a point to multipoint (Point to Multipoint, PTM) technology. The PTM is generally implemented by using a multimedia broadcast multicast service (Multimedia Broadcast Multicast Service, MBMS) technology. An enhanced multimedia broadcast multicast service (enhanced Multimedia Broadcast Multicast Service, eMBMS) technology is a technology used to deliver a same service to multiple UEs by using a broadcast channel, where a group of UEs receiving the same service receive the service by using a same downlink configuration, and it is unnecessary to establish a separate link for each UE.

However, the current eMBMS uses a multicast broadcast single frequency network (Multicast Broadcast Single Frequency Network, MBSFN) technology, where all cells in an area use a same resource to send a service. In an area in which group communication is performed by using the eMBMS, if UEs in a group are unevenly distributed, and there may be few users or no user in some cells, the radio resource usage efficiency is relatively low in a cell that has few users or no user.

SUMMARY

Embodiments of the present invention provide a group communication method and an apparatus, allowing group communication to be performed at the granularity of per cell, thereby saving transmission resources used in the group communication, and increasing resource utilization.

According to a first aspect, a base station is provided, including:

a processing module, configured to determine to start scheduling PTM transmission in a first cell, where the scheduling PTM transmission is used to enable user equipment UE in the first cell to receive data on a scheduling PTM transmission resource; and a sending module, configured to: send configuration information of the scheduling PTM transmission to the UE in the first cell, where the configuration information is used to enable the UE in the first cell to receive data according to an indication of the configuration information; and send, on the scheduling PTM transmission resource, data according to the indication of the configuration information.

With reference to the first aspect, in a first possible implementation manner of the first aspect, the sending module is further configured to: before sending, on the scheduling PTM transmission resource, the data according to the indication of the configuration information, send a multicast joining request message to an MBMS gateway;

the base station further includes: a receiving module, configured to receive data sent by the MBMS gateway; and the sending module is specifically configured to send, on the scheduling PTM transmission resource according to the indication of the configuration information, the data received from the MBMS gateway.

With reference to the first aspect or the first possible implementation manner of the first aspect, in the second possible implementation manner of the first aspect, the receiving module is further configured to: before the processing module determines to start the scheduling PTM transmission in the first cell, receive a first cell scheduling PTM transmission start notification message sent by an upper-level network device, where the upper-level network device includes an MCE, an MME, or an application server; and the processing module is specifically configured to: when the receiving module receives the first cell scheduling PTM transmission start notification message, determine to start the scheduling PTM transmission in the first cell.

With reference to the second possible implementation manner of the first aspect, in a third possible implementation manner of the first aspect, the receiving module is specifically configured to receive an MBMS task start message sent by the upper-level network device, where the MBMS task start message includes the first cell scheduling PTM transmission start notification message, and the first cell scheduling PTM transmission start notification message carries identification information or scheduling PTM transmission indication information of the first cell.

With reference to the first aspect or the first possible implementation manner of the first aspect, in a fourth possible implementation manner of the first aspect, the receiving module is further configured to: before the processing module determines to start the scheduling PTM transmission in the first cell, receive information about the UE in the first cell sent by an upper-level network device, where the upper-level network device includes an MCE, an MME, or an application server; and the processing module is specifically configured to: if a quantity of UEs in the first cell exceeds a preset threshold, determine to start the scheduling PTM transmission in the first cell.

With reference to the first aspect or the first possible implementation manner of the first aspect, in a fifth possible implementation manner of the first aspect, the receiving module is further configured to: before the processing module determines to start the scheduling PTM transmission in the first cell, receive first information sent by the UE in the first cell, where the first information includes group service information that the UE expects to receive; and the processing module is specifically configured to: in the first information sent by the UE in the first cell, if a quantity of same group service information expected to be received exceeds a preset threshold, determine to start the scheduling PTM transmission in the first cell, where the scheduling PTM transmission is used to transmit the group service information that is expected to be received and whose quantity exceeds the preset threshold.

With reference to any possible implementation manner of the first aspect to the fifth possible implementation manner of the first aspect, in a sixth possible implementation manner of the first aspect, the receiving module is further configured to receive second information sent by the UE in the first cell, where the second information includes information about a source cell in which the UE is located before the UE hands over to or reselects the first cell; and the sending module is further configured to send third information to a source base station to which the source cell of the UE sends the second information belongs, where the third information includes information about the UE that sends the second information, and the third information is used to enable the source base station to exclude, when counting the quantity of the group service information expected to be received, the UE that sends the second information.

With reference to any possible implementation manner of the first aspect to the sixth possible implementation manner of the first aspect, in a seventh possible implementation manner of the first aspect, the configuration information of the scheduling PTM transmission includes:

an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

With reference to any possible implementation manner of the first aspect to the seventh possible implementation manner of the first aspect, in an eighth possible implementation manner of the first aspect, the processing module is further configured to: before the sending module sends the configuration information of the scheduling PTM transmission to the UE in the first cell, determine a service list of scheduling PTM transmission of a neighboring cell of the first cell; and the sending module is specifically configured to send the configuration information of the scheduling PTM transmission and the service list of the scheduling PTM transmission of the neighboring cell of the first cell to the UE in the first cell.

With reference to any possible implementation manner of the first aspect to the eighth possible implementation manner of the first aspect, in a ninth possible implementation manner of the first aspect, the sending module is specifically configured to broadcast the configuration information of the scheduling PTM transmission to the UE in the first cell by using system information; or send the configuration information of the scheduling PTM transmission to the UE in the first cell by using a dedicated message.

With reference to the ninth possible implementation manner of the first aspect, in a tenth possible implementation manner of the first aspect, the sending module is further configured to: before broadcasting the configuration information of the scheduling PTM transmission to the UE in the first cell by using the system information, instruct, by using a paging message, the UE in the first cell to read the configuration information of the scheduling PTM transmission from the system information, where the paging message uses the RNTI of the scheduling PTM transmission or the paging message includes an indication for reading the configuration information of the scheduling PTM transmission.

According to a second aspect, user equipment is provided, including:

a receiving module, configured to receive configuration information of scheduling PTM transmission sent by a base station; and a processing module, configured to determine, according to an indication of the configuration information, to receive data that is sent on a scheduling PTM transmission resource by the base station, where the receiving module is further configured to receive, according to the indication of the configuration information, the data that is sent on the scheduling PTM transmission resource by the base station.

With reference to the second aspect, in a first possible implementation manner of the second aspect, the user equipment further includes:

a sending module, configured to: before the receiving module receives the configuration information of the scheduling PTM transmission sent by the base station, send first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

With reference to the second aspect or the first possible implementation manner of the second aspect, in a second possible implementation manner of the second aspect, the sending module is further configured to send second information to the base station, where the second information includes information about a source cell in which the UE is located before the UE hands over to or reselects the cell in which the UE is located, and the second information is used to enable the base station to send third information to a source base station to which the source cell of the UE belongs, where the third information includes information about the UE, and the third information is used to enable the source base station to exclude the UE when counting a quantity of the group service information expected to be received.

With reference to any possible implementation manner of the second aspect to the second possible implementation manner of the second aspect, in a third possible implementation manner of the second aspect, the configuration information of the scheduling PTM transmission includes:

an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

With reference to the third possible implementation manner of the second aspect, in a fourth possible implementation manner of the second aspect, the processing module is specifically configured to: determine, according to the TMGI corresponding to the scheduling PTM transmission, to receive the data that is sent on the scheduling PTM transmission resource by the base station; and determine, according to the RNTI of the scheduling PTM transmission, to receive an RNTI used by the data that is sent on the scheduling PTM transmission resource by the base station; and the receiving module is specifically configured to receive, according to the RNTI, on a transmission resource indicated by the resource configuration information used in the scheduling PTM transmission, the data that is sent on the scheduling PTM transmission resource by the base station.

With reference to any possible implementation manner of the second aspect to the fourth possible implementation manner of the second aspect, in a fifth possible implementation manner of the second aspect, the receiving module is specifically configured to receive the configuration information of the scheduling PTM transmission sent by the base station, and a service list of scheduling PTM transmission of a neighboring cell of the cell in which the UE is located; and the processing module is further configured to: determine whether the neighboring cell of the cell in which the UE is located is sending scheduling PTM transmission data; and when the UE moves from the cell in which the UE is located to the neighboring cell of the cell in which the UE is located, determine, according to whether the neighboring cell of the cell in which the UE is located is sending the scheduling PTM transmission data, to continue to receive data by means of the scheduling PTM transmission or trigger establishment of a unicast bearer.

With reference to any possible implementation manner of the second aspect to the fifth possible implementation manner of the second aspect, in a sixth possible implementation manner of the second aspect, the receiving module is specifically configured to receive the configuration information of the scheduling PTM transmission that is broadcast, in the cell in which the UE is located, by the base station by using system information; or receive the configuration information of the scheduling PTM transmission that is sent by the base station by using a dedicated message.

With reference to the sixth possible implementation manner of the second aspect, in a seventh possible implementation manner of the second aspect, the receiving module is further configured to: before receiving the configuration information of the scheduling PTM transmission that is broadcast, in the cell in which the UE is located, by the base station by using the system information, receive a paging message sent by the base station, where the paging message is used to instruct the UE to read the configuration information of the scheduling PTM transmission from the system information, and the paging message uses the RNTI of the scheduling PTM transmission or the paging message includes an indication for reading the configuration information of the scheduling PTM transmission.

According to a third aspect, a group communication method is provided, including:

determining, by a base station, to start scheduling PTM transmission in a first cell, where the scheduling PTM transmission is used to enable user equipment UE in the first cell to receive data on a scheduling PTM transmission resource;

sending, by the base station, configuration information of the scheduling PTM transmission to the UE in the first cell, where the configuration information is used to enable the UE in the first cell to receive data according to an indication of the configuration information; and sending, by the base station, on the scheduling PTM transmission resource, data according to the indication of the configuration information.

With reference to the third aspect, in a first possible implementation manner of the third aspect, before the sending, by the base station, on the scheduling PTM transmission resource, data according to the indication of the configuration information, the method further includes:

sending, by the base station, a multicast joining request message to an MBMS gateway; and receiving, by the base station, data sent by the MBMS gateway; and the sending, by the base station, on the scheduling PTM transmission resource, data according to the indication of the configuration information includes:

sending, by the base station, on the scheduling PTM transmission resource according to the indication of the configuration information, the data received from the MBMS gateway.

With reference to the third aspect or the first possible implementation manner of the third aspect, in a second possible implementation manner of the third aspect, before the determining, by a base station, to start scheduling PTM transmission in a first cell, the method further includes:

receiving, by the base station, a first cell scheduling PTM transmission start notification message sent by an upper-level network device, where the upper-level network device includes an MCE, an MME, or an application server; and the determining, by a base station, to start scheduling PTM transmission in a first cell includes:

when the base station receives the first cell scheduling PTM transmission start notification message, determining, by the base station, to start the scheduling PTM transmission in the first cell.

With reference to the second possible implementation manner of the third aspect, in a third possible implementation manner of the third aspect, the receiving, by the base station, a first cell scheduling PTM transmission start notification message sent by an upper-level network device includes:

receiving, by the base station, an MBMS task start message sent by the upper-level network device, where the MBMS task start message includes the first cell scheduling PTM transmission start notification message, and the first cell scheduling PTM transmission start notification message carries identification information or scheduling PTM transmission indication information of the first cell.

With reference to the third aspect or the first possible implementation manner of the third aspect, in a fourth possible implementation manner of the third aspect, before the determining, by a base station, to start scheduling PTM transmission in a first cell, the method further includes:

receiving, by the base station, information about the UE in the first cell sent by an upper-level network device, where the upper-level network device includes an MCE, an MME, or an application server; and the determining, by a base station, to start scheduling PTM transmission in a first cell includes:

if a quantity of UEs in the first cell exceeds a preset threshold, determining, by the base station, to start the scheduling PTM transmission in the first cell.

With reference to the third aspect or the first possible implementation manner of the third aspect, in a fifth possible implementation manner of the third aspect, before the determining, by a base station, to start scheduling PTM transmission in a first cell, the method further includes:

receiving, by the base station, first information sent by the UE in the first cell, where the first information includes group service information that the UE expects to receive; and the determining, by a base station, to start scheduling PTM transmission in a first cell includes:

in the first information sent by the UE in the first cell, if a quantity of same group service information expected to be received exceeds a preset threshold, determining, by the base station, to start the scheduling PTM transmission in the first cell, where the scheduling PTM transmission is used to transmit the group service information that is expected to be received and whose quantity exceeds the preset threshold.

With reference to any possible implementation manner of the third aspect to the fifth possible implementation manner of the third aspect, in a sixth possible implementation manner of the third aspect, the method further includes:

receiving, by the base station, second information sent by the UE in the first cell, where the second information includes information about a source cell in which the UE is located before the UE hands over to or reselects the first cell; and sending, by the base station, third information to a source base station to which the source cell of the UE that sends the second information belongs, where the third information includes information about the UE that sends the second information, and the third information is used to enable the source base station to exclude, when counting the quantity of the group service information expected to be received, the UE that sends the second information.

With reference to any possible implementation manner of the third aspect to the sixth possible implementation manner of the third aspect, in a seventh possible implementation manner of the third aspect, the configuration information of the scheduling PTM transmission includes:

an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

With reference to any possible implementation manner of the third aspect to the seventh possible implementation manner of the third aspect, in an eighth possible implementation manner of the third aspect, before the sending, by the base station, configuration information of the scheduling PTM transmission to the UE in the first cell, the method further includes:

determining, by the base station, a service list of scheduling PTM transmission of a neighboring cell of the first cell; and the sending, by the base station, configuration information of the scheduling PTM transmission to the UE in the first cell includes:

sending, by the base station, the configuration information of the scheduling PTM transmission and the service list of the scheduling PTM transmission of the neighboring cell of the first cell to the UE in the first cell.

With reference to any possible implementation manner of the third aspect to the eighth possible implementation manner of the third aspect, in a ninth possible implementation manner of the third aspect, the sending, by the base station, configuration information of the scheduling PTM transmission to the UE in the first cell includes:

broadcasting, by the base station, the configuration information of the scheduling PTM transmission to the UE in the first cell by using system information; or sending, by the base station, the configuration information of the scheduling PTM transmission to the UE in the first cell by using a dedicated message.

With reference to the ninth possible implementation manner of the third aspect, in a tenth possible implementation manner of the third aspect, before the broadcasting, by the base station, the configuration information of the scheduling PTM transmission to the UE in the first cell by using system information, the method further includes:

instructing, by the base station, by using a paging message, the UE in the first cell to read the configuration information of the scheduling PTM transmission from the system information, where the paging message uses the RNTI of the scheduling PTM transmission or the paging message includes an indication for reading the configuration information of the scheduling PTM transmission.

According to a fourth aspect, a group communication method is provided, including:

receiving, by UE, configuration information of scheduling PTM transmission sent by a base station; and receiving, by the UE according to an indication of the configuration information, data that is sent on a scheduling PTM transmission resource by the base station.

With reference to the fourth aspect, in a first possible implementation manner of the fourth aspect, before the receiving, by UE, configuration information of scheduling PTM transmission sent by a base station, the method further includes:

sending, by the UE, first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

With reference to the fourth aspect or the first possible implementation manner of the fourth aspect, in a second possible implementation manner of the fourth aspect, the method further includes:

sending, by the UE, second information to the base station, where the second information includes information about a source cell in which the UE is located before the UE hands over to or reselects the cell in which the UE is located, and the second information is used to enable the base station to send third information to a source base station to which the source cell of the UE belongs, where the third information includes information about the UE, and the third information is used to enable the source base station to exclude the UE when counting a quantity of the group service information expected to be received.

With reference to any possible implementation manner of the fourth aspect to the second possible implementation manner of the fourth aspect, in a third possible implementation manner of the fourth aspect, the configuration information of the scheduling PTM transmission includes:

an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

With reference to the third possible implementation manner of the fourth aspect, in a fourth possible implementation manner of the fourth aspect, the receiving, by the UE according to an indication of the configuration information, data that is sent on a scheduling PTM transmission resource by the base station includes:

determining, by the UE according to the TMGI corresponding to the scheduling PTM transmission, to receive the data that is sent on the scheduling PTM transmission resource by the base station;

determining, by the UE according to the RNTI of the scheduling PTM transmission, to receive an RNTI used by the data that is sent on the scheduling PTM transmission resource by the base station; and receiving, by the UE according to the RNTI, on a transmission resource indicated by the resource configuration information used in the scheduling PTM transmission, the data that is sent on the scheduling PTM transmission resource by the base station.

With reference to any possible implementation manner of the fourth aspect to the fourth possible implementation manner of the fourth aspect, in a fifth possible implementation manner of the fourth aspect, the receiving, by UE, configuration information of scheduling PTM transmission sent by a base station includes:

receiving, by the UE, the configuration information of the scheduling PTM transmission sent by the base station, and a service list of scheduling PTM transmission of a neighboring cell of the cell in which the UE is located; and determining, by the UE, whether the neighboring cell of the cell in which the UE is located is sending scheduling PTM transmission data; and the method further includes:

when the UE moves from the cell in which the UE is located to the neighboring cell of the cell in which the UE is located, determining, by the UE according to whether the neighboring cell of the cell in which the UE is located is sending the scheduling PTM transmission data, to continue to receive data by means of the scheduling PTM transmission or trigger establishment of a unicast bearer.

With reference to any possible implementation manner of the fourth aspect to the fifth possible implementation manner of the fourth aspect, in a sixth possible implementation manner of the fourth aspect, the receiving, by UE, configuration information of scheduling PTM transmission sent by a base station includes:

receiving, by the UE, the configuration information of the scheduling PTM transmission that is broadcast, in the cell in which the UE is located, by the base station by using system information; or receiving, by the UE, the configuration information of the scheduling PTM transmission that is sent by the base station by using a dedicated message.

With reference to the sixth possible implementation manner of the fourth aspect, in a seventh possible implementation manner of the fourth aspect, before the receiving, by the UE, the configuration information of the scheduling PTM transmission that is broadcast, in the cell in which the UE is located, by the base station by using system information, the method further includes:

receiving, by the UE, a paging message sent by the base station, where the paging message is used to instruct the UE to read the configuration information of the scheduling PTM transmission from the system information, and the paging message uses the RNTI of the scheduling PTM transmission or the paging message includes an indication for reading the configuration information of the scheduling PTM transmission.

By means of the group communication method and the apparatus that are provided in the embodiments of the present invention, a base station determines to start scheduling PTM transmission in a first cell, then sends configuration information of the scheduling PTM transmission to UE in the first cell, and sends, on a scheduling PTM transmission resource, data according to an indication of the configuration information, so that the base station can perform PTM transmission at the granularity of per cell, which saves transmission resources, and increases resource utilization.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
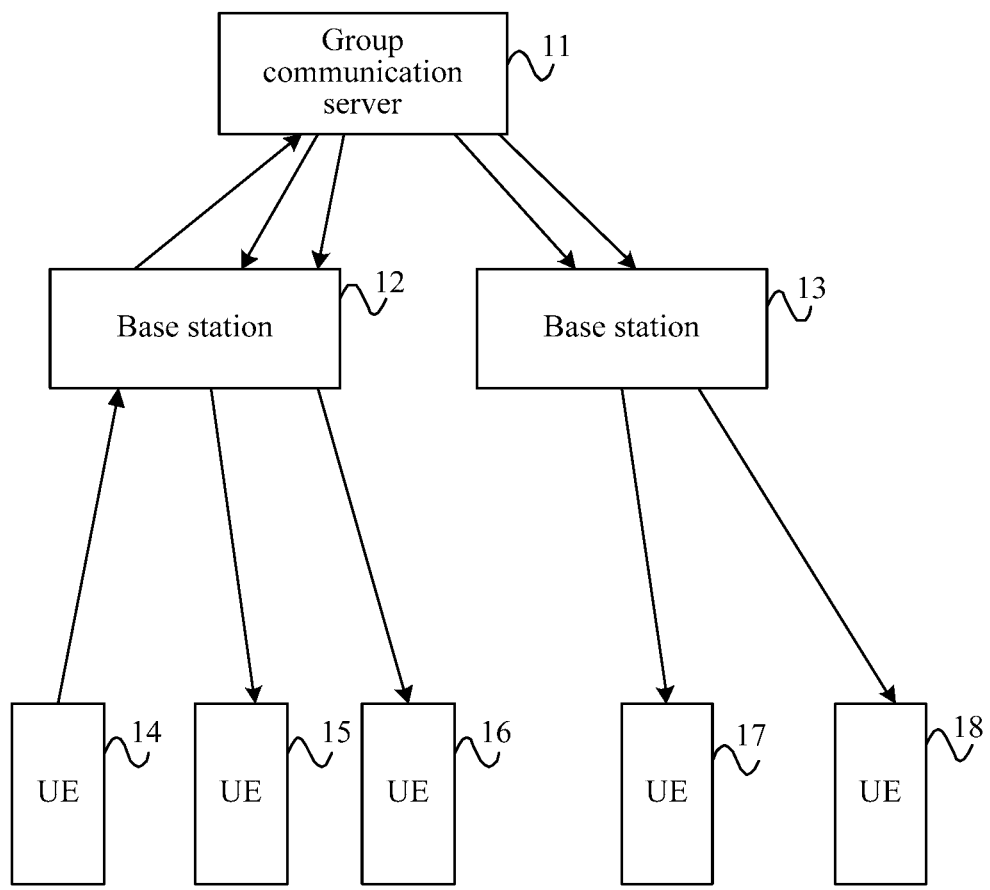
FIG. 1 is a schematic diagram of a group communication system architecture in voice communication.

FIG. 1 is a schematic diagram of a group communication system architecture in voice communication. As shown in FIG. 1, a network is set with a group communication server 11, several base stations, and several UEs, where in FIG. 1, two base stations are used as an example for illustration: a base station 12 and a base station 13, and five UEs are used as an example for illustration: UE 14 to UE 18. The UE 14, UE 15, and UE 16 access the base station 12, and the UE 17 and UE 18 access the base station 13.

In the system shown in FIG. 1, as UEs in one group, the UE 14 to the UE 18 may perform group communication with each other. However, in the system shown in FIG. 1, only one UE of a group of UEs can send voice data at a time, and other UEs receive the voice data of the UE. For example, the UE 14 sends voice data to the base station 12, and then the base station 12 sends the voice data to the group communication server 11. Then, the group communication server 11 sends the voice data to the base station 12 and the base station 13, and then the base station 12 and the base station 13 separately send the voice data to the UE 15, UE 16, UE 17, and UE 18. In the system shown in FIG. 1, on an access network side, each UE needs a separate downlink voice channel, therefore wasting resources on the access network side.

Figure 2:
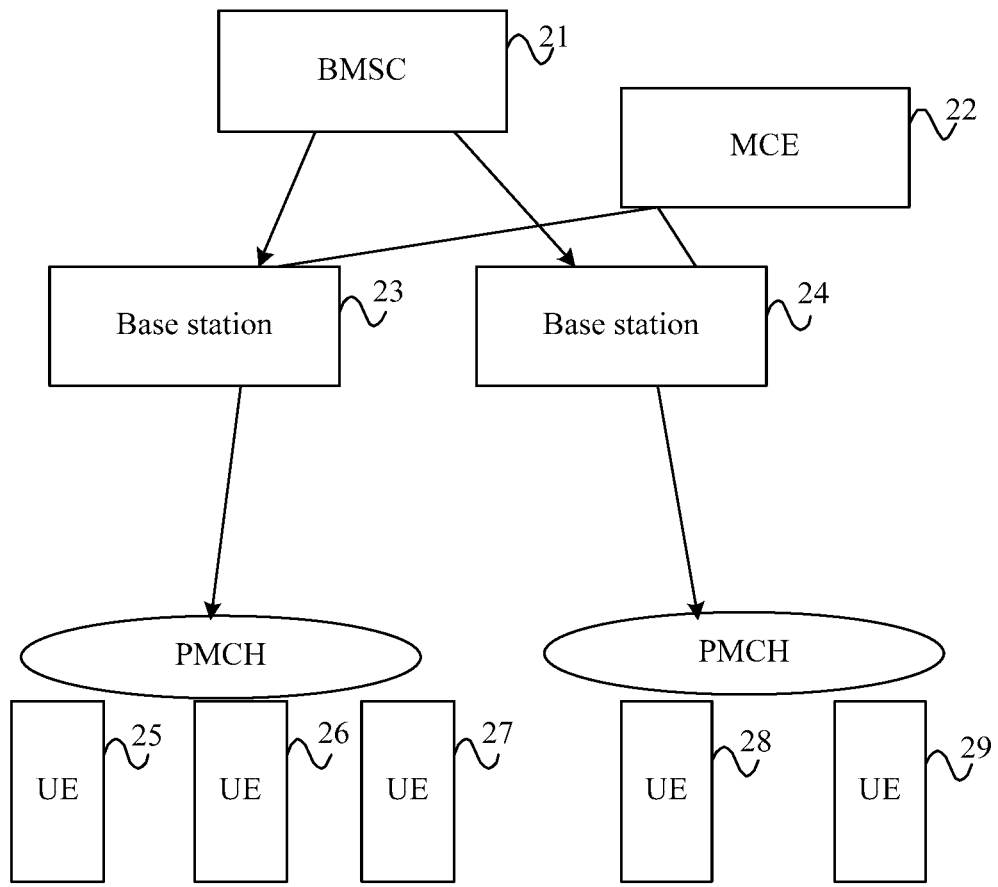
FIG. 2 is a schematic diagram of an MBMS system architecture.

FIG. 2 is a schematic diagram of an MBMS system architecture. As shown in FIG. 2, a network is set with a broadcast multicast service center (Broadcast Multicast Service Center, BMSC) 21, a multi-cell/multicast coordination entity (Multi-cell/multicast Coordination Entity, MCE) 22, several base stations, and several UEs, where in FIG. 2, two base stations are used as an example for illustration: a base station 23 and a base station 24, and five UEs are used as an example for illustration: UE 25 to UE 29. The UE 25, UE 26, and UE 27 access the base station 23, and the UE 28 and UE 29 access the base station 24.

In the system shown in FIG. 2, as UEs in one group, the UE 25 to the UE 29 may receive same broadcast multicast data. The BMSC 21 sends broadcast multicast data to the base station 23 and the base station 24, and the MCE 22 is configured to coordinate broadcast multicast data of the base stations. The base stations send broadcast multicast data to UEs by using a physical multicast channel (Physical Multicast Channel, PMCH). However, in the system shown in FIG. 2, the broadcast multicast data sent by the base stations to UEs are the same. On a network, if there is a base station that does not connect to UE or a cell of a base station that does not connect to UE, the base station still needs to receive the broadcast multicast data sent by the BMSC, and still needs to send, on the PMCH, the broadcast multicast data. This causes relatively low efficiency of radio resources.

In summary, all current group communication methods have defects, causing a waste of radio resources or relatively low usage efficiency of radio resources.

Figure 3:
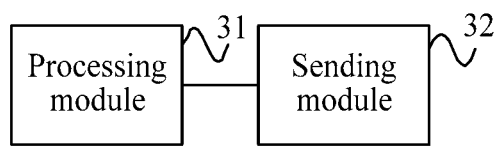
FIG. 3 is a schematic structural diagram of Embodiment 1 of a base station according to an embodiment of the present invention.

FIG. 3 is a schematic structural diagram of Embodiment 1 of a base station according to an embodiment of the present invention. As shown in FIG. 3, the base station in this embodiment includes:

a processing module 31, configured to determine to start scheduling PTM transmission in a first cell, where the scheduling PTM transmission is used to enable user equipment UE in the first cell to receive data on a scheduling PTM transmission resource; and a sending module 32, configured to: send configuration information of the scheduling PTM transmission to the UE in the first cell, where the configuration information is used to enable the UE in the first cell to receive data according to an indication of the configuration information; and send, on the scheduling PTM transmission resource, data according to the indication of the configuration information.

Specifically, the base station provided in this embodiment is applied to the MBMS system architecture shown in FIG. 2. The base station includes the processing module 31 and the sending module 32. The processing module 31 is configured to determine to start the scheduling PTM transmission in the first cell, and the sending module 32 is configured to send the configuration information of the scheduling PTM transmission to the UE in the first cell, and send, on the scheduling PTM transmission resource, the data according to the indication of the configuration information.

In a current MBMS technology, when PTM transmission needs to be performed, all base stations receive broadcast multicast data from a BMSC, and each base station sends, in all provided cells, the broadcast multicast data, causing low resource utilization. However, in the base station provided in this embodiment, first of all, the processing module 31 determines to start the scheduling PTM transmission in the first cell, then the sending module 32 sends the configuration information of the scheduling PTM transmission to the UE in the first cell, and finally the sending module 32 sends the data on the scheduling PTM transmission resource. Therefore, the PTM transmission can be performed at the granularity of per cell, and the PTM transmission does not need to be performed on the entire network. The scheduling PTM transmission is used to enable the UE in the first cell to receive the data on the scheduling PTM transmission resource. In other words, a purpose of the scheduling PTM transmission is to perform the PTM transmission at the granularity of per cell. One base station may provide multiple cells, a determining module 31 can determine whether to start the scheduling PTM transmission in a cell, according to a status of UE in each cell, for example, UE data or a requirement of the UE, or another specific condition.

The scheduling PTM transmission is performed for the UE in the first cell. Therefore, different from the MBMS shown in FIG. 2, after the processing module 31 determines to start the PTM transmission in the first cell, the base station further needs to notify the UE in the first cell that the PTM transmission is to be performed. The sending module 32 first sends the configuration information of the scheduling PTM transmission to the UE in the first cell, where the configuration information of the scheduling PTM transmission enables the UE in the first cell to learn that the base station is to perform the scheduling PTM transmission, and learn related configuration information for receiving scheduling PTM transmission data. Then, the sending module 32 can send, on the scheduling PTM transmission resource, the data according to the indication of configuration information.

The base station provided in this embodiment performs PTM transmission at the granularity of per cell. Therefore, when the base station determines that PTM transmission does not need to be performed in a cell, the base station does not start the scheduling PTM transmission in the cell, so that the cell does not need to allocate a transmission resource for the PTM transmission, thereby saving the transmission resource, and increasing resource utilization.

The base station provided in this embodiment determines to start scheduling PTM transmission in a first cell, then sends configuration information of the scheduling PTM transmission to UE in the first cell, and sends, on a scheduling PTM transmission resource, data according to an indication of the configuration information, so that the base station can perform PTM transmission at the granularity of per cell, which saves transmission resources, and increases resource utilization.

Figure 4:
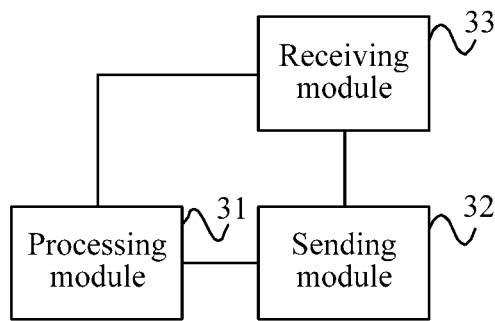
FIG. 4 is a schematic structural diagram of Embodiment 2 of a base station according to an embodiment of the present invention.

FIG. 4 is a schematic structural diagram of Embodiment 2 of a base station according to an embodiment of the present invention. As shown in FIG. 4, on the basis of FIG. 3, the base station in this embodiment further includes:

a receiving module 33, configured to receive data sent by an MBMS gateway.

The sending module 32 is further configured to: before sending, on the scheduling PTM transmission resource, the data according to the indication of the configuration information, send a multicast joining request message to the MBMS gateway.

Specifically, after the processing module 31 determines to start the scheduling PTM transmission in the first cell, if the base station has started scheduling PTM transmission in another cell, the base station has received PTM data sent from the MBMS gateway, and sends the PTM data to another cell by using the sending module 32. In this case, when the processing module 31 determines to start the scheduling PTM transmission in the first cell, the base station may directly send, in the first cell by using the sending module 32, the PTM data received from the MBMS gateway.

If the base station has not yet started scheduling PTM transmission in another cell, before sending, on the scheduling PTM transmission resource, the data according to the indication of the configuration information, the sending module 32 further needs to send the multicast joining request message to the MBMS gateway. In other words, if the base station has not started scheduling PTM transmission in any cell, the base station first needs to send the multicast joining request message to the MBMS gateway by using the sending module 32, to request to join a multicast service. Then, the receiving module 33 receives data sent by the MBMS gateway, where the data is the PTM data. In this case, the sending module 32 can send, on the scheduling PTM transmission resource according to the indication of the configuration information, the data received from the MBMS gateway.

On the basis of the embodiment shown in FIG. 3, the base station provided in this embodiment implements that a base station that has not joined a multicast service can perform group communication.

It should be noted that, in the embodiment shown in FIG. 3 or FIG. 4, there may be multiple trigger conditions for the processing module 31 to determine to start the scheduling PTM transmission in the first cell, which are separately described one by one in the following.

In a first case, an upper-level network device determines to start the PTM transmission in the first cell, and the base station starts the PTM transmission in the first cell according to an indication of the upper-level network device. The upper-level network device includes an MCE, a mobility management entity (Mobility Management Entity, MME), an application server, or the like.

In this case, the receiving module 33 is further configured to: before the processing module 31 determines to start scheduling PTM transmission in the first cell, receive a first cell scheduling PTM transmission start notification message sent by the upper-level network device; and the processing module 31 is specifically configured to: when the receiving module 33 receives the first cell scheduling PTM transmission start notification message, determine to start the scheduling PTM transmission in the first cell.

Specifically, the upper-level network device collects UE position information, and the upper-level network device determines, according to the collected UE position information, whether to start the PTM transmission. The upper-level network device may learn a coverage area of each cell, and therefore may determine, according to the collected UE position information, a cell in which the UE is located. The upper-level network device may determine, according to a quantity of UEs in each cell, whether to start the scheduling PTM transmission in the cell. If a quantity of UEs in a cell exceeds a preset threshold, the upper-level network device may determine to start the scheduling PTM transmission in the cell. After the receiving module 33 receives the first cell scheduling PTM transmission start notification message sent by the upper-level network device, the processing module 31 may determine to start the scheduling PTM transmission in the cell. The upper-level network device determines, according to the quantity of UEs in the first cell, whether to start the scheduling PTM transmission in the first cell, and instructs, only when the quantity of the UEs in the first cell exceeds the preset threshold, the base station to start the scheduling PTM transmission in the first cell. Therefore, when there is an excessively small quantity of UEs or no UE in a cell, the base station does not receive a scheduling PTM transmission start notification message sent by the upper-level network device, avoiding a problem of the excessively low resource efficiency caused by starting the PTM transmission in a cell that has no UE or an excessively small quantity of UEs.

Further, the receiving module 33 is specifically configured to receive an MBMS task start message sent by the upper-level network device, where the MBMS task start message includes the first cell scheduling PTM transmission start notification message, and the first cell scheduling PTM transmission start notification message carries identification information or scheduling PTM transmission indication information of the first cell. In other words, a manner in which the upper-level network device instructs the base station to start the scheduling PTM transmission may be sending an MBMS task start (MBMS session start) message to the base station. Optionally, the MBMS task start message may carry the identification information or the scheduling PTM transmission indication information of the first cell, so that after the receiving module 33 receives the MBMS task start message sent by the upper-level network device, the determining module 31 determines to start the scheduling PTM transmission in the first cell.

In a second case, an upper-level network device collects UE information, the base station receives the UE information sent by the upper-level network device, and the base station determines, according to the UE information, to start the PTM transmission in the first cell.

In this case, the receiving module 33 is further configured to: before the processing module 31 determines to start the scheduling PTM transmission in the first cell, receive information that is about UE in the first cell and that is sent by the upper-level network device; and the processing module 31 is specifically configured to: if a quantity of UEs in the first cell exceeds a preset threshold, determine to start the scheduling PTM transmission in the first cell.

Specifically, the upper-level network device collects the UE information, where the information includes but is not limited to UE position information. The upper-level network device sends the collected UE information to a base station that serves the UE. After the receiving module 33 in the base station receives the UE information sent by the upper-level network device, UEs located in the first cell may be determined. Then, the processing module 31 determines the quantity of the UEs in the first cell. When the quantity of the UEs in the first cell exceeds a preset threshold, the processing module 31 determines to start the scheduling PTM transmission in the first cell. The processing module 31 in the base station determines, according to the quantity of the UEs in the first cell, whether to start the scheduling PTM transmission in the first cell, and determines, only when the quantity of the UEs in the first cell exceeds the preset threshold, to start the scheduling PTM transmission in the first cell. Therefore, when there is an excessively small quantity of UEs or no UE in a cell, the processing module 31 does not determine to start the PTM transmission in the cell, avoiding a problem of the excessively low resource efficiency caused by starting the PTM transmission in a cell that has no UE or an excessively small quantity of UEs.

In the second case, UEs served by the base station send, to the base station, group service information that the UEs are interested in, and the base station determines, according to the group service information that the UEs are interested in and that is reported by the UEs, to start the PTM transmission in the first cell.

In this case, the receiving module 33 is further configured to: before the processing module 31 determines to start the scheduling PTM transmission in the first cell, receive first information sent by the UE in the first cell, where the first information includes group service information that the UE expects to receive; and the processing module 31 is specifically configured to: in the first information sent by the UE in the first cell, if a quantity of same group service information expected to be received exceeds a preset threshold, determine to start the scheduling PTM transmission in the first cell, where the scheduling PTM transmission is used to transmit the group service information that is expected to be received and whose quantity exceeds the preset threshold.

Specifically, all the UEs served by the base station may send the group service information that the UEs are interested in to the base station, for example, voice-type information, text-type information, and video-type information, or group service information categorized in another categorization manner, where the information is referred to as the first information. After receiving the first information sent by the UEs, the receiving module 33 collects the first information sent by the UEs located in the first cell, and then the processing module 31 determines whether a quantity of same group service information expected to be received in the first information sent by the UEs in the first cell exceeds a preset threshold. If the quantity exceeds the preset threshold, the processing module 31 may determine that, among the UEs in the first cell, many users expect to receive a particular piece of group service information, and therefore may determine to start the scheduling PTM transmission in the first cell. In addition, the scheduling PTM transmission is used to transmit the group service information that is expected to be received and whose quantity exceeds the preset threshold. The processing module 31 in the base station determines, according to group service information that the UE in the first cell expects to receive, whether to start the scheduling PTM transmission in the first cell, and determines, only when a quantity of same group service information that the UE in the first cell expects to receive exceeds the preset threshold, to start the scheduling PTM transmission in the first cell. Therefore, in a cell, when a quantity of same group service information that UE expects to receive is excessively small or there is no same group service information that UE expects to receive, the processing module 31 does not determine to start the PTM transmission in the cell, avoiding a problem of the excessively low resource efficiency caused by starting the PTM transmission in a cell that has no UE or an excessively small quantity of UEs.

Further, in the embodiment shown in FIG. 4, the receiving module 33 is further configured to receive second information sent by the UE in the first cell, where the second information includes information about a source cell in which the UE is located before the UE hands over to or reselects the first cell; and the sending module 32 is further configured to send third information to a source base station to which the source cell of the UE that sends the second information belongs, where the third information includes the information about the UE that sends the second information, and the third information is used to enable the source base station to exclude, when counting the quantity of the group service information expected to be received, the UE that sends the second information.

Specifically, in mobile communication, UE may be in a mobile state, and therefore the UE may be handed over between cells. With reference to the cases in this embodiment of the present invention, when the base station provides a group communication service to UE in a cell, if the UE in the cell moves out of the cell, the base station cannot provide the group communication service to the UE. In the foregoing second or third case, the base station determines whether to start the scheduling PTM transmission in the first cell; therefore, if UE in a cell moves out of the cell, when counting a quantity of UEs in the cell or collecting statistics on group service information that UE expects to receive, the base station needs to exclude the UE that moves out of the cell. Herein, a specific implementation method is provided. The receiving module 33 in the base station is further configured to receive the second information sent by the UE in the first cell, where the second information includes information about a source cell in which the UE is located before the UE hands over to or reselects the first cell. That is, the base station acquires information about a source cell in which the UE in the first cell is located before the UE hands over to or reselects the first cell. Then, the sending module 32 sends third information to the source cell of the UE that sends the second information, where the third information includes the information about the UE that sends the second information. After receiving the third information, the source cell may determine that the UE that sends the second information and that is included in the third information has moved to or reselected the first cell, and then, when counting a quantity of group service information expected to be received or counting a quantity of UEs in the cell, the source base station excludes the UE that sends the second information.

Further, in the embodiment shown in FIG. 3 or FIG. 4, the configuration information of the scheduling PTM transmission includes: a radio network temporary identity (Radio Network Temporary Identity, RNTI) of the scheduling PTM transmission, a temporary multicast group identity (Temporary Multicast Group Identity, TMGI) corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission. After receiving the foregoing information sent by the base station, the UE in the first cell may determine that the base station needs to perform scheduling PTM transmission, and use a corresponding identifier or resource to receive data sent by the base station.

Further, in the embodiment shown in FIG. 3 or FIG. 4, the processing module 31 is further configured to: before the sending module 32 sends the configuration information of the scheduling PTM transmission to the UE in the first cell, determine a service list of scheduling PTM transmission of a neighboring cell of the first cell; and the sending module 32 is specifically configured to send the configuration information of the scheduling PTM transmission and the service list of the scheduling PTM transmission of the neighboring cell of the first cell to the UE in the first cell.

Specifically, the UE may be in the mobile state. Therefore, the UE in the first cell may move to a neighboring cell of the first cell. When the UE in the first cell is receiving scheduling PTM transmission data sent by the base station, if the UE moves to the neighboring cell of the first cell, the UE may fail to continue to receive the scheduling PTM transmission data. To resolve this problem, the processing module 31 is further configured to: before the sending module 32 sends the configuration information of the scheduling PTM transmission to the UE in the first cell, determine a service list of scheduling PTM transmission of a neighboring cell of the first cell. The service list of the scheduling PTM transmission of the neighboring cell of the first cell includes PTM transmission service data that is being sent by the neighboring cell of the first cell. After the UE in first cell receives the service list of the scheduling PTM transmission of the neighboring cell of the first cell, when the UE moves to the neighboring cell of the first cell, if the neighboring cell is also performing the scheduling PTM transmission and a scheduling PTM transmission service is the same as a scheduling PTM transmission service in the first cell, the UE may directly continue to receive, in the neighboring cell, scheduling PTM data.

Further, in the embodiment shown in FIG. 3 or FIG. 4, the sending module 32 is specifically configured to broadcast the configuration information of the scheduling PTM transmission to the UE in the first cell by using system information; or send the configuration information of the scheduling PTM transmission to the UE in the first cell by using a dedicated message.

Further, in the embodiment shown in FIG. 3 or FIG. 4, the sending module 32 is further configured to: before broadcasting the configuration information of the scheduling PTM transmission to the UE in the first cell by using the system information, instruct, by using a paging message, the UE in the first cell to read the configuration information of the scheduling PTM transmission from the system information, where the paging message uses the RNTI of the scheduling PTM transmission or the paging message includes an indication for reading the configuration information of the scheduling PTM transmission.

Specifically, if the sending module 32 needs to broadcast the configuration information of the scheduling PTM transmission to the UE in the first cell by using the system information, before the broadcasting, the sending module 32 further needs to instruct, by using a paging (paging) message, the UE in the first cell to read the configuration information of the scheduling PTM transmission from the system information. The system information broadcast by the base station includes relatively much content, and is broadcast and sent to all UEs served by the base station. Therefore, after the processing module 31 determines to start the scheduling PTM transmission in the first cell, the sending module 32 needs to send the paging message to the UE in the first cell, to instruct the UE to read the configuration information of the scheduling PTM transmission from the system information. Then, after the base station broadcasts the configuration information of the scheduling PTM transmission to the UE in the first cell by using the system information, the UE in the first cell can acquire the configuration information of the scheduling PTM transmission from the system information.

Figure 5:
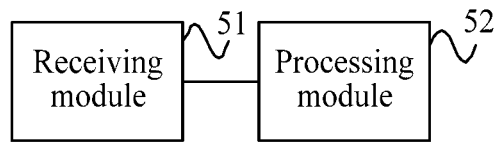
FIG. 5 is a schematic structural diagram of Embodiment 1 of UE according to an embodiment of the present invention.

FIG. 5 is a schematic structural diagram of Embodiment 1 of UE according to an embodiment of the present invention. As shown in FIG. 5, the UE in this embodiment includes:

a receiving module 51, configured to receive configuration information of scheduling PTM transmission sent by a base station; and a processing module 52, configured to determine, according to an indication of the configuration information, to receive data that is sent on a scheduling PTM transmission resource by the base station, where the receiving module 51 is further configured to receive, according to the indication of the configuration information, the data that is sent on the scheduling PTM transmission resource by the base station.

Specifically, the UE provided in this embodiment is applied to an MBMS system architecture shown in FIG. 2. The UE includes the receiving module 51 and the processing module 52.

In a current MBMS technology, when a base station determines that PTM transmission needs to be performed, all base stations receive broadcast multicast data from a BMSC, each base station sends, in all provided cells, the broadcast multicast data, and all UEs served by the base stations receive the broadcast multicast data. Therefore, the resource utilization is low. However, in the UE provided in this embodiment, first of all, the processing module 31 receives the configuration information of the scheduling PTM transmission sent by the base station, and after the processing module 52 determines, according to the indication of the configuration information, to receive the data that is sent on the scheduling PTM transmission resource by the base station, the receiving module 51 receives, according to the indication of the configuration information, the data that is sent on the scheduling PTM transmission resource by the base station. In other words, when a base station performs PTM transmission, not all UEs served by the base station receive PTM transmission data; instead, the UE first receives configuration information of scheduling PTM transmission sent by the base station, where the configuration information of the scheduling PTM transmission is sent by the base station to UE in a first cell after the base station determines to start the scheduling PTM transmission in the first cell. The base station performs the PTM transmission at the granularity of per cell, and does not need to perform the PTM transmission on the entire network. The scheduling PTM transmission is used to enable the UE in the first cell to receive data on the scheduling PTM transmission resource. In other words, a purpose of the scheduling PTM transmission is to perform the PTM transmission at the granularity of per cell.

The base station provided in this embodiment performs PTM transmission at the granularity of per cell. Therefore, when the base station determines that the PTM transmission does not need to be performed in a cell, the base station does not start the scheduling PTM transmission in the cell, and the UE in the cell does not receive the configuration information of the scheduling PTM transmission sent by the base station, so that the cell does not need to allocate a transmission resource for the PTM transmission, thereby saving the transmission resource, and increasing the resource utilization.

The UE provided in this embodiment receives configuration information of scheduling PTM transmission sent by a base station, then determines, according to an indication of the configuration information, to receive data sent on a scheduling PTM transmission resource by the base station, and finally receives, according to the indication of the configuration information, the data sent on the scheduling PTM transmission resource by the base station. Therefore, PTM transmission can be flexibly performed, saving transmission resources, and increasing resource utilization.

Figure 6:
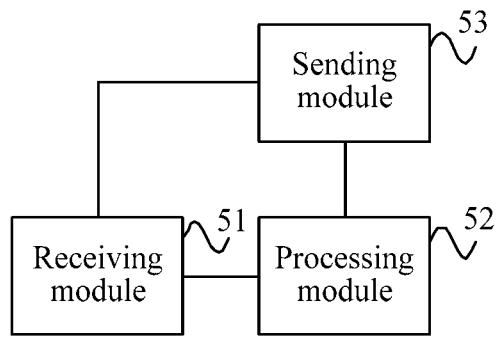
FIG. 6 is a schematic structural diagram of Embodiment 2 of UE according to an embodiment of the present invention.

FIG. 6 is a schematic structural diagram of Embodiment 2 of UE according to an embodiment of the present invention. As shown in FIG. 6, on the basis of FIG. 5, the UE in this embodiment further includes:

a sending module 53, configured to: before the receiving module 51 receives the configuration information of the scheduling PTM transmission sent by the base station, send first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

Specifically, the sending module 53 in the UE may send the group service information that the UE is interested in to the base station, for example, voice-type information, text-type information, and video-type information, or group service information categorized in another categorization manner, where the information is referred to as the first information. Before the receiving module 51 receives the configuration information of the scheduling PTM transmission sent by the base station, and after the sending module 53 sends the first information to the base station, the base station collects first information sent by all UEs located in the cell in which the UE is located, then the base station determines whether a quantity of same group service information expected to be received in the first information sent by the UEs in the first cell exceeds a preset threshold. If the quantity exceeds the preset threshold, the base station may determine that, among the UEs in the first cell, many users expect to receive a particular piece of group service information, and therefore may determine to start the scheduling PTM transmission in the first cell. In addition, the scheduling PTM transmission is used to transmit the group service information that is expected to be received and whose quantity exceeds the preset threshold. The base station determines, according to group service information that the UE in the first cell expects to receive, whether to start the scheduling PTM transmission in the first cell, and determines, only when a quantity of same group service information that the UE in the first cell expects to receive exceeds the preset threshold, to start the scheduling PTM transmission in the first cell. Therefore, in a cell, when a quantity of same group service information that UE expects to receive is excessively small or there is no same group service information that UE expects to receive, the base station does not determine to start the PTM transmission in the cell, avoiding a problem of the excessively low resource efficiency caused by starting the PTM transmission in a cell that has no UE or an excessively small quantity of UEs.

Further, in the embodiment shown in FIG. 6, the sending module 53 is further configured to send second information to the base station, where the second information includes information about a source cell in which the UE is located before the UE hands over to or reselects the cell in which the UE is located, and the second information is used to enable the base station to send third information to a source base station to which the source cell of the UE belongs, where the third information includes information about the UE, and the third information is used to enable the source base station to exclude the UE when counting a quantity of the group service information expected to be received.

Specifically, in mobile communication, UE may be in a mobile state, and therefore the UE may be handed over between cells. With reference to the cases in this embodiment of the present invention, when the base station provides a group communication service to UE in a cell, if the UE in the cell moves out of the cell, the base station cannot provide the group communication service to the UE. Therefore, the sending module 53 in the UE is further configured to send second information to the base station, where the second information includes information about a source cell in which the UE is located before the UE hands over to or reselects the first cell. After receiving the second information, the base station sends third information to the source cell of the UE that sends the second information, where the third information includes information about the UE that sends the second information. After receiving the third information, the source cell may determine that the UE that sends the second information and that is included in the third information has moved to or reselected the first cell, and then, when counting a quantity of group service information expected to be received or counting a quantity of UEs in the cell, the source base station excludes the UE that sends the second information.

Further, in the embodiment shown in FIG. 5 or FIG. 6, the configuration information of the scheduling PTM transmission includes: an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

Further, in the embodiment shown in FIG. 5 or FIG. 6, the processing module 52 is specifically configured to: determine, according to the TMGI corresponding to the scheduling PTM transmission, to receive the data that is sent on the scheduling PTM transmission resource by the base station; and determine, according to the RNTI of the scheduling PTM transmission, to receive an RNTI used by the data that is sent on the scheduling PTM transmission resource by the base station; and the receiving module 51 is specifically configured to receive, according to the RNTI, on a transmission resource indicated by the resource configuration information used in the scheduling PTM transmission, the data that is sent on the scheduling PTM transmission resource by the base station.

Further, in the embodiment shown in FIG. 5 or FIG. 6, the receiving module 51 is specifically configured to receive the configuration information of the scheduling PTM transmission sent by the base station, and a service list of scheduling PTM transmission of a neighboring cell of the cell in which the UE is located; and the processing module 52 is further configured to: determine whether the neighboring cell of the cell in which the UE is located is sending scheduling PTM transmission data; and when the UE moves from the cell in which the UE is located to the neighboring cell of the cell in which the UE is located, determine, according to whether the neighboring cell of the cell in which the UE is located is sending the scheduling PTM transmission data, to continue to receive data by means of the scheduling PTM transmission or trigger establishment of a unicast bearer.

Specifically, the UE may be in the mobile state. Therefore, the UE may move to the neighboring cell of the cell in which the UE is located. When the UE is receiving scheduling PTM transmission data sent by the base station, if the UE moves to the neighboring cell of the cell, the UE may fail to continue to receive the scheduling PTM transmission data. To resolve this problem, when receiving the configuration information of the scheduling PTM transmission sent by the base station, the receiving module 51 in the UE is further configured to receive the service list, which is sent by the base station, of the scheduling PTM transmission of the neighboring cell of the cell in which the UE is located. The service list of the scheduling PTM transmission of the neighboring cell of the cell in which the UE is located includes PTM transmission service data that is being sent by the neighboring cell of the cell in which the UE is located. After the receiving module 51 receives the service list of the scheduling PTM transmission of the neighboring cell of the cell in which the UE is located, the processing module 52 may determine whether the neighboring cell of the cell in which the UE is located is sending scheduling PTM transmission data. When the UE moves to the neighboring cell of the cell in which the UE is located, if the neighboring cell is also performing the scheduling PTM transmission and a scheduling PTM transmission service is the same as a scheduling PTM transmission service in the cell in which the UE is located, the UE may directly continue to receive, in the neighboring cell, scheduling PTM data.

Further, in the embodiment shown in FIG. 5 or FIG. 6, the receiving module 51 is specifically configured to receive the configuration information of the scheduling PTM transmission that is broadcast, in the cell in which the UE is located, by the base station by using system information; or receive the configuration information of the scheduling PTM transmission that is sent by the base station by using a dedicated message.

Further, in the embodiment shown in FIG. 5 or FIG. 6, the receiving module 51 is further configured to: before receiving the configuration information of the scheduling PTM transmission that is broadcast, in the cell in which the UE is located, by the base station by using the system information, receive a paging message sent by the base station, where the paging message is used to instruct the UE to read the configuration information of the scheduling PTM transmission from the system information, and the paging message uses the RNTI of the scheduling PTM transmission or the paging message includes an indication for reading the configuration information of the scheduling PTM transmission.

Specifically, if the receiving module 51 needs to receive the configuration information of the scheduling PTM transmission broadcast by the base station by using the system information, before the receiving, the receiving module 51 further needs to learn, by using a paging (paging) message, that the base station sends the configuration information of the scheduling PTM transmission in the system information, thereby reading the configuration information of the scheduling PTM transmission from the system information. The system information broadcast by the base station includes relatively much content, and is broadcast and sent to all UEs served by the base station. Therefore, before receiving the configuration information of the scheduling PTM transmission that is broadcast, in the cell in which the UE is located, by the base station by using the system information, the receiving module 51 further needs to receive a paging message sent by the base station, where the paging message is used to instruct the UE to read the configuration information of the scheduling PTM transmission from the system information, and the paging message uses the RNTI of the scheduling PTM transmission or the paging message includes an indication for reading the configuration information of the scheduling PTM transmission.

Figure 7:
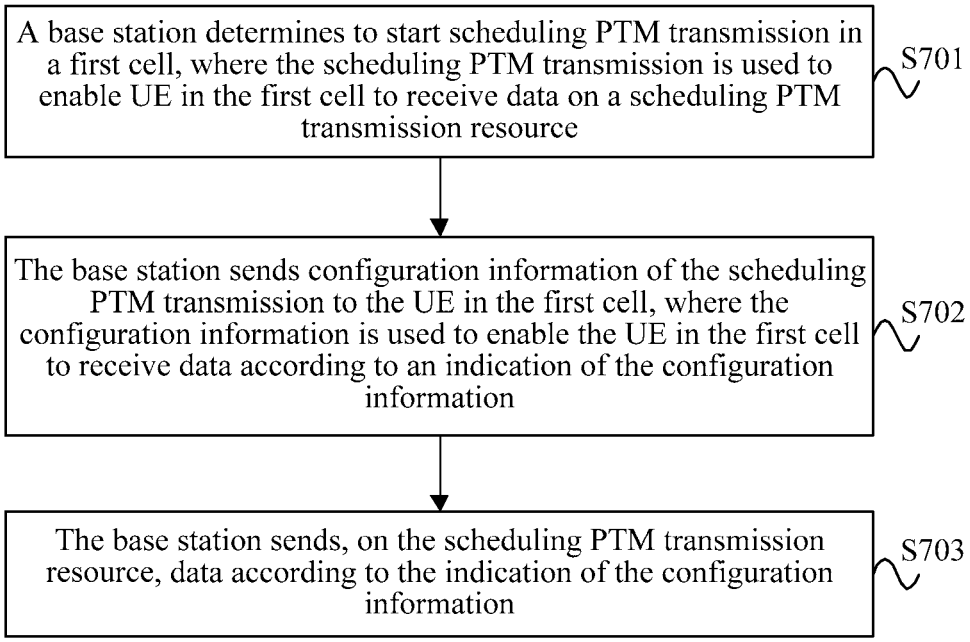
FIG. 7 is a flowchart of Embodiment 1 of a group communication method according to an embodiment of the present invention.

FIG. 7 is a flowchart of Embodiment 1 of a group communication method according to an embodiment of the present invention. As shown in FIG. 7, the method in this embodiment includes:

Step S701: A base station determines to start scheduling PTM transmission in a first cell, where the scheduling PTM transmission is used to enable UE in the first cell to receive data on a scheduling PTM transmission resource.

Step S702: The base station sends configuration information of the scheduling PTM transmission to the UE in the first cell, where the configuration information is used to enable the UE in the first cell to receive data according to an indication of the configuration information.

Step S703: The base station sends, on the scheduling PTM transmission resource, data according to the indication of the configuration information.

The group communication method provided in this embodiment is used to complete processing of the base station shown in FIG. 3, and has a similar implementation principle and technical effect; details are not described herein again.

Figure 8:
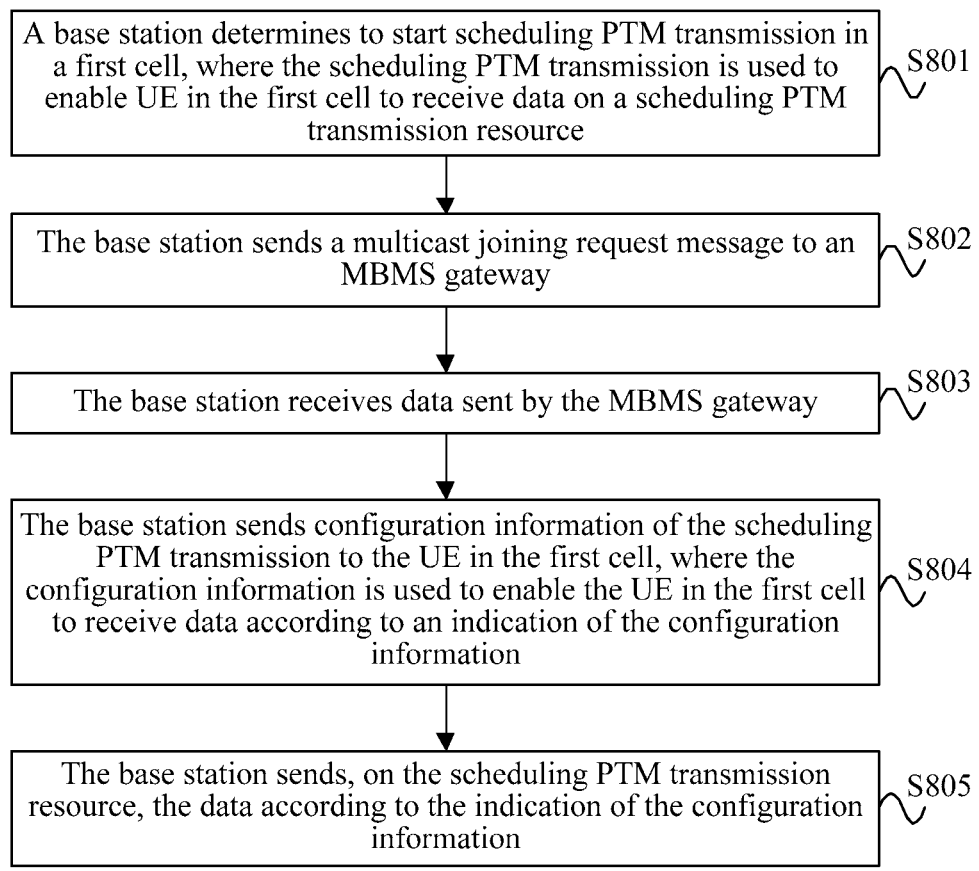
FIG. 8 is a flowchart of Embodiment 2 of a group communication method according to an embodiment of the present invention.

FIG. 8 is a flowchart of Embodiment 2 of a group communication method according to an embodiment of the present invention. As shown in FIG. 8, the method in this embodiment includes:

Step S801: A base station determines to start scheduling PTM transmission in a first cell, where the scheduling PTM transmission is used to enable user equipment UE in the first cell to receive data on a scheduling PTM transmission resource.

Step S802: The base station sends a multicast joining request message to an MBMS gateway.

Step S803: The base station receives data sent by the MBMS gateway.

Step S804: The base station sends configuration information of the scheduling PTM transmission to the UE in the first cell, where the configuration information is used to enable the UE in the first cell to receive data according to an indication of the configuration information.

Step S805: The base station sends, on the scheduling PTM transmission resource according to the indication of the configuration information, the data received from the MBMS gateway.

The group communication method provided in this embodiment is used to complete processing of the base station shown in FIG. 4, and has a similar implementation principle and technical effect; details are not described herein again.

Further, in the embodiment shown in FIG. 7 or FIG. 8, before the determining, by a base station, to start scheduling PTM transmission in a first cell, the method further includes: receiving, by the base station, a first cell scheduling PTM transmission start notification message sent by an upper-level network device, where the upper-level network device includes an MCE, an MME, or an application server; and the determining, by a base station, to start scheduling PTM transmission in a first cell includes: when the base station receives the first cell scheduling PTM transmission start notification message, determining, by the base station, to start the scheduling PTM transmission in the first cell.

Further, in the embodiment shown in FIG. 7 or FIG. 8, the receiving, by the base station, a first cell scheduling PTM transmission start notification message sent by an upper-level network device includes: receiving, by the base station, an MBMS task start message sent by the upper-level network device, where the MBMS task start message includes the first cell scheduling PTM transmission start notification message, and the first cell scheduling PTM transmission start notification message carries identification information or scheduling PTM transmission indication information of the first cell.

Further, in the embodiment shown in FIG. 7 or FIG. 8, before the determining, by a base station, to start scheduling PTM transmission in a first cell, the method further includes: receiving, by the base station, information about the UE in the first cell sent by an upper-level network device, where the upper-level network device includes an MCE, an MME, or an application server; and the determining, by a base station, to start scheduling PTM transmission in a first cell includes: if a quantity of UEs in the first cell exceeds a preset threshold, determining, by the base station, to start the scheduling PTM transmission in the first cell.

Further, in the embodiment shown in FIG. 7 or FIG. 8, before the determining, by a base station, to start scheduling PTM transmission in a first cell, the method further includes: receiving, by the base station, first information sent by the UE in the first cell, where the first information includes group service information that the UE expects to receive; and the determining, by a base station, to start scheduling PTM transmission in a first cell includes: in the first information sent by the UE in the first cell, if a quantity of same group service information expected to be received exceeds a preset threshold, determining, by the base station, to start the scheduling PTM transmission in the first cell, where the scheduling PTM transmission is used to transmit the group service information that is expected to be received and whose quantity exceeds the preset threshold.

Figure 9:
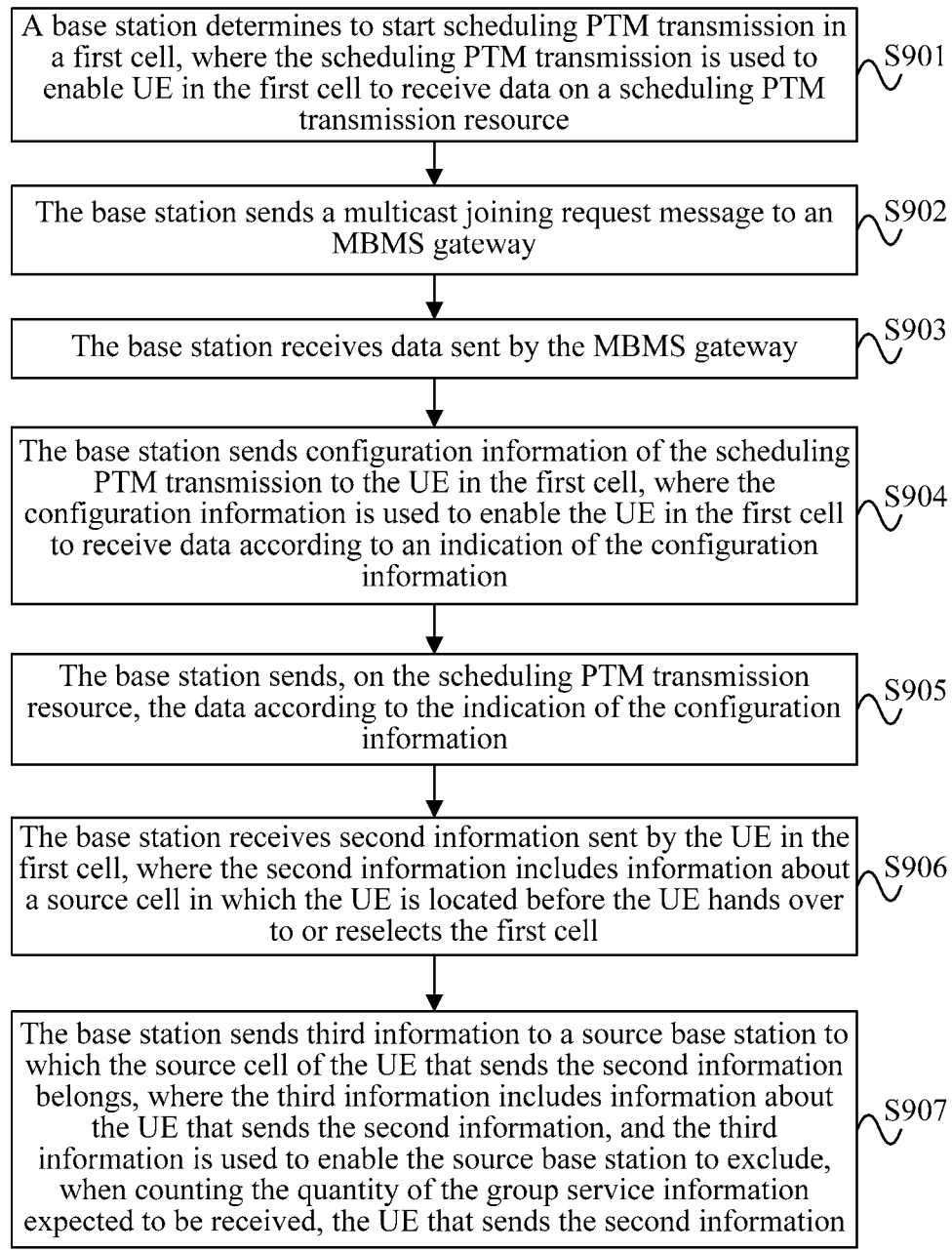
FIG. 9 is a flowchart of Embodiment 3 of a group communication method according to an embodiment of the present invention.

FIG. 9 is a flowchart of Embodiment 3 of a group communication method according to an embodiment of the present invention. As shown in FIG. 9, the method in this embodiment includes:

Step S901: A base station determines to start scheduling PTM transmission in a first cell, where the scheduling PTM transmission is used to enable user equipment UE in the first cell to receive data on a scheduling PTM transmission resource.

Step S902: The base station sends a multicast joining request message to an MBMS gateway.

Step S903: The base station receives data sent by the MBMS gateway.

Step S904: The base station sends configuration information of the scheduling PTM transmission to the UE in the first cell, where the configuration information is used to enable the UE in the first cell to receive data according to an indication of the configuration information.

Step S905: The base station sends, on the scheduling PTM transmission resource according to the indication of the configuration information, the data received from the MBMS gateway.

Step S906: The base station receives second information sent by the UE in the first cell, where the second information includes information about a source cell in which the UE is located before the UE hands over to or reselects the first cell.

Step S907: The base station sends third information to a source base station to which the source cell of the UE that sends the second information belongs, where the third information includes information about the UE that sends the second information, and the third information is used to enable the source base station to exclude, when counting the quantity of the group service information expected to be received, the UE that sends the second information.

Further, in the embodiments shown in FIG. 7 to FIG. 9, the configuration information of the scheduling PTM transmission includes: an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

Further, in the embodiments shown in FIG. 7 to FIG. 9, before the sending, by the base station, configuration information of the scheduling PTM transmission to the UE in the first cell, the method further includes: determining, by the base station, a service list of scheduling PTM transmission of a neighboring cell of the first cell; and the sending, by the base station, configuration information of the scheduling PTM transmission to the UE in the first cell includes: sending, by the base station, the configuration information of the scheduling PTM transmission and the service list of the scheduling PTM transmission of the neighboring cell of the first cell to the UE in the first cell.

Further, in the embodiments shown in FIG. 7 to FIG. 9, the sending, by the base station, configuration information of the scheduling PTM transmission to the UE in the first cell includes: broadcasting, by the base station, the configuration information of the scheduling PTM transmission to the UE in the first cell by using system information; or sending, by the base station, the configuration information of the scheduling PTM transmission to the UE in the first cell by using a dedicated message.

Further, in the embodiments shown in FIG. 7 to FIG. 9, before the broadcasting, by the base station, the configuration information of the scheduling PTM transmission to the UE in the first cell by using system information, the method further includes: instructing, by the base station, by using a paging message, the UE in the first cell to read the configuration information of the scheduling PTM transmission from the system information, where the paging message uses the RNTI of the scheduling PTM transmission or the paging message includes an indication for reading the configuration information of the scheduling PTM transmission.

Figure 10:
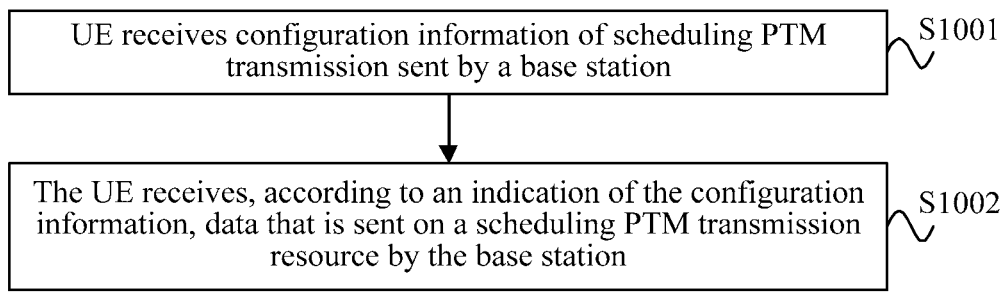
FIG. 10 is a flowchart of Embodiment 4 of a group communication method according to an embodiment of the present invention.

FIG. 10 is a flowchart of Embodiment 4 of a group communication method according to an embodiment of the present invention. As shown in FIG. 10, the method in this embodiment includes:

Step S1001: UE receives configuration information of scheduling PTM transmission sent by a base station.

Step S1002: The UE receives, according to an indication of the configuration information, data that is sent on a scheduling PTM transmission resource by the base station.

The group communication method provided in this embodiment is used to complete processing of the UE shown in FIG. 5, and has a similar implementation principle and technical effect; details are not described herein again.

Figure 11:
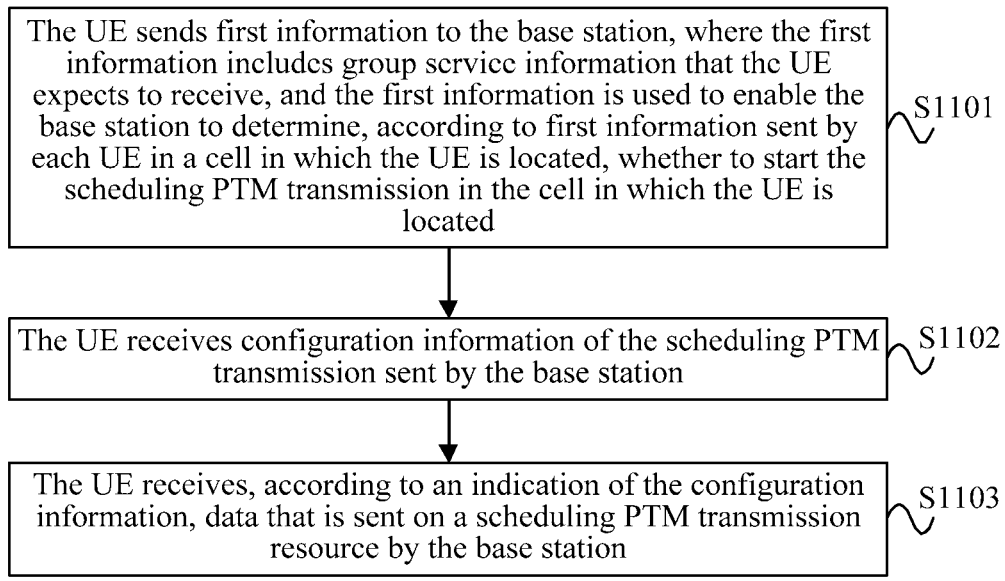
FIG. 11 is a flowchart of Embodiment 5 of a group communication method according to an embodiment of the present invention.

FIG. 11 is a flowchart of Embodiment 5 of a group communication method according to an embodiment of the present invention. As shown in FIG. 11, the method in this embodiment includes:

Step S1101: The UE sends first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

Step S1102: The UE receives configuration information of the scheduling PTM transmission sent by the base station.

Step S1103: The UE receives, according to an indication of the configuration information, data that is sent on a scheduling PTM transmission resource by the base station.

The group communication method provided in this embodiment is used to complete processing of the UE shown in FIG. 6, and has a similar implementation principle and technical effect; details are not described herein again.

Further, in the embodiment shown in FIG. 10 or FIG. 11, before the receiving, by UE, configuration information of scheduling PTM transmission sent by a base station, the method further includes: sending, by the UE, first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

Figure 12:
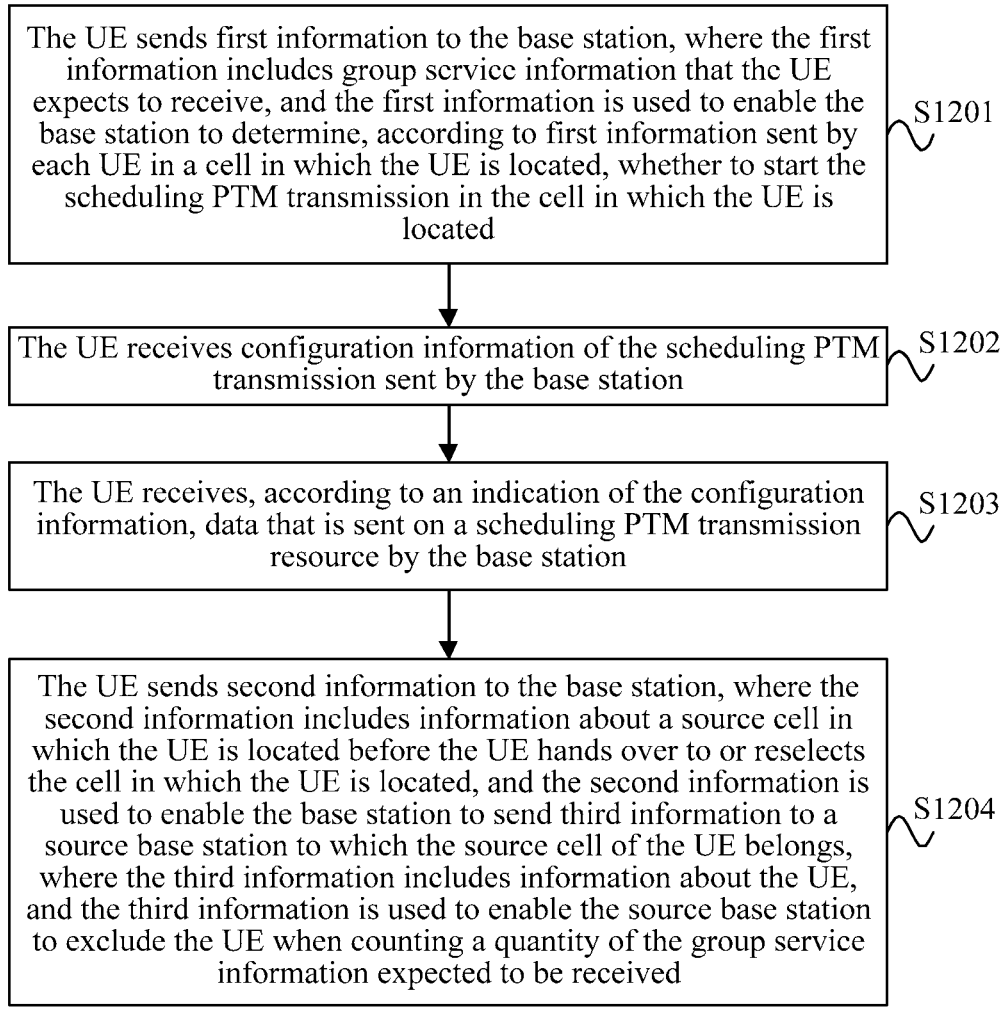
FIG. 12 is a flowchart of Embodiment 6 of a group communication method according to an embodiment of the present invention.

FIG. 12 is a flowchart of Embodiment 6 of a group communication method according to an embodiment of the present invention. As shown in FIG. 12, the method in this embodiment includes:

Step S1201: The UE sends first information to the base station, where the first information includes group service information that the UE expects to receive, and the first information is used to enable the base station to determine, according to first information sent by each UE in a cell in which the UE is located, whether to start the scheduling PTM transmission in the cell in which the UE is located.

Step S1202: The UE receives configuration information of the scheduling PTM transmission sent by the base station.

Step S1203: The UE receives, according to an indication of the configuration information, data that is sent on a scheduling PTM transmission resource by the base station.

Step S1204: The UE sends second information to the base station, where the second information includes information about a source cell in which the UE is located before the UE hands over to or reselects the cell in which the UE is located, and the second information is used to enable the base station to send third information to a source base station to which the source cell of the UE belongs, where the third information includes information about the UE, and the third information is used to enable the source base station to exclude the UE when counting a quantity of the group service information expected to be received.

Further, in the embodiments shown in FIG. 10 to FIG. 12, the configuration information of the scheduling PTM transmission includes: an RNTI of the scheduling PTM transmission, a TMGI corresponding to the scheduling PTM transmission, and/or resource configuration information used in the scheduling PTM transmission, where the RNTI of the scheduling PTM transmission is used to indicate, to the UE, the RNTI used in the scheduling PTM transmission, the TMGI corresponding to the scheduling PTM transmission is used to indicate an MBMS service identifier of RNTI scheduling of the scheduling PTM transmission, and the resource configuration information used in the scheduling PTM transmission includes subframe and/or frequency resource configuration information used in the scheduling PTM transmission.

Further, in the embodiments shown in FIG. 10 to FIG. 12, the receiving, by the UE according to an indication of the configuration information, data that is sent on a scheduling PTM transmission resource by the base station includes: determining, by the UE according to the TMGI corresponding to the scheduling PTM transmission, to receive the data that is sent on the scheduling PTM transmission resource by the base station; determining, by the UE according to the RNTI of the scheduling PTM transmission, to receive an RNTI used by the data that is sent on the scheduling PTM transmission resource by the base station; and receiving, by the UE according to the RNTI, on a transmission resource indicated by the resource configuration information used in the scheduling PTM transmission, the data that is sent on the scheduling PTM transmission resource by the base station.

Further, in the embodiments shown in FIG. 10 to FIG. 12, the receiving, by UE, configuration information of scheduling PTM transmission sent by a base station includes: receiving, by the UE, the configuration information of the scheduling PTM transmission sent by the base station, and a service list of scheduling PTM transmission of a neighboring cell of the cell in which the UE is located; and determining, by the UE, whether the neighboring cell of the cell in which the UE is located is sending scheduling PTM transmission data; and the method further includes: when the UE moves from the cell in which the UE is located to the neighboring cell of the cell in which the UE is located, determining, by the UE according to whether the neighboring cell of the cell in which the UE is located is sending the scheduling PTM transmission data, to continue to receive data by means of the scheduling PTM transmission or trigger establishment of a unicast bearer.

Further, in the embodiments shown in FIG. 10 to FIG. 12, the receiving, by UE, configuration information of scheduling PTM transmission sent by a base station includes: receiving, by the UE, the configuration information of the scheduling PTM transmission that is broadcast, in the cell in which the UE is located, by the base station by using system information; or receiving, by the UE, the configuration information of the scheduling PTM transmission that is sent by the base station by using a dedicated message.

Further, in the embodiments shown in FIG. 10 to FIG. 12, before the receiving, by the UE, the configuration information of the scheduling PTM transmission that is broadcast, in the cell in which the UE is located, by the base station by using system information, the method further includes: receiving, by the UE, a paging message sent by the base station, where the paging message is used to instruct the UE to read the configuration information of the scheduling PTM transmission from the system information, and the paging message uses the RNTI of the scheduling PTM transmission or the paging message includes an indication for reading the configuration information of the scheduling PTM transmission.

It should be noted that, the receiving module 33 in this embodiment of the present invention may correspond to a receiver of a base station, or may correspond to a transceiver of a base station. The sending module 32 may correspond to a transmitter of the base station, or may correspond to the transceiver of the base station. The processing module 31 may correspond to a processor of the base station. Herein, the processor may be a central processing unit (Central Processing Unit, CPU), or an application specific integrated circuit (Application Specific Integrated Circuit, ASIC), or one or more integrated circuits that implement this embodiment of the present invention. The base station may further include a memory, where the memory is configured to store instruction code, and the processor invokes the instruction code in the memory, to control the receiving module 33 and the sending module 32 in this embodiment of the present invention to perform the foregoing operations.

The sending module 53 in this embodiment of the present invention may correspond to a transmitter of user equipment, or may correspond to a transceiver of user equipment. The receiving module 51 may correspond to a receiver of the user equipment, or may correspond to the transceiver of the user equipment. The processing module 52 may correspond to a processor of the user equipment. Herein, the processor may be a CPU, or an ASIC, or one or more integrated circuits that implement this embodiment of the present invention. The user equipment may further include a memory, where the memory is configured to store instruction code, and the processor invokes the instruction code in the memory, to control the sending module 53 and the receiving module 51 in this embodiment of the present invention to perform the foregoing operations.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A method comprising:
    determining, by a base station, to start scheduling point to multipoint (PTM) transmission in a first cell;
    determining a service list of scheduling PTM transmission of a neighboring cell of the first cell, wherein the service list includes PTM transmission service data that is being sent by the neighboring cell;
    sending, by the base station, configuration information of the scheduling PTM transmission to a user equipment (UE) in the first cell, wherein the configuration information of the scheduling PTM transmission comprises a radio network temporary identity (RNTI) of the scheduling PTM transmission, a temporary multicast group identity (TMGI) corresponding to the scheduling PTM transmission, and resource configuration information used in the scheduling PTM transmission, wherein the RNTI of the scheduling PTM transmission is used to indicate, to the UE, the RNTI used in the scheduling PTM transmission, the TMGI corresponding to the scheduling PTM transmission is used to indicate a multimedia broadcast multicast service (MBMS) service identifier of RNTI scheduling of the scheduling PTM transmission, and the resource configuration information used in the scheduling PTM transmission comprises subframe and frequency resource configuration information used in the scheduling of the PTM transmission; and
    sending, by the base station, data to the UE using the subframe and the frequency resource used for the scheduling PTM transmission in the first cell.

2. The method according to claim 1, wherein
    the sending of the configuration information of the scheduling PTM transmission comprises:
    sending the configuration information and the service list to the UE in the first cell.

3. The method according to claim 1, wherein before the determining to start the scheduling PTM transmission in the first cell, the method further comprises:
    receiving, by the base station, a scheduling PTM transmission start notification message of the first cell from a multi-cell/multicast coordination entity (MCE); and
    the determining to start the scheduling PTM transmission in the first cell comprises:
    in response to receiving the scheduling PTM transmission start notification message of the first cell, determining, by the base station, to start the scheduling PTM transmission in the first cell.

4. The method according to claim 3, wherein the scheduling PTM transmission start notification message of the first cell is a multimedia broadcast multicast service (MBMS) task start message, the MBMS task start message comprises identification information of the first cell.

5. An apparatus comprising:
    a storage medium including executable instructions; and
    a processor;
    wherein the executable instructions, when executed by the processor, cause the apparatus to:
    determine to start scheduling point to multipoint (PTM) transmission in a first cell;
    determine a service list of scheduling PTM transmission of a neighboring cell of the first cell, wherein the service list includes PTM transmission service data that is being sent by the neighboring cell;

send configuration information of the scheduling PTM transmission to a user equipment (UE) in the first cell, wherein the configuration information comprises a radio network temporary identity (RNTI) of the scheduling PTM transmission, a temporary multicast group identity (TMGI) corresponding to the scheduling PTM transmission, and resource configuration information used in the scheduling PTM transmission, wherein the RNTI of the scheduling PTM transmission is used to indicate, to the UE, the RNTI used in the scheduling PTM transmission, the TMGI corresponding to the scheduling PTM transmission is used to indicate a multimedia broadcast multicast service (MBMS) service identifier of RNTI scheduling of the scheduling PTM transmission, and the resource configuration information used in the scheduling PTM transmission comprises subframe and frequency resource configuration information used in the scheduling of the PTM transmission; and send data to the UE using the subframe and the frequency resource used for the scheduling PTM transmission in the first cell.

6. The apparatus according to claim 5, wherein the sending of the configuration information of the scheduling PTM transmission comprises:

sending the configuration information and the service list to the UE in the first cell.

7. The apparatus according to claim 5, wherein before the determining to start the scheduling PTM transmission in the first cell, the executable instructions, when executed by the processor, further cause the apparatus to:

receive a scheduling PTM transmission start notification message of the first cell from a multi-cell/multicast coordination entity (MCE); and the determining to start the scheduling PTM transmission in the first cell comprises:

in response to receiving the scheduling PTM transmission start notification message of the first cell, determining, by the base station, to start the scheduling PTM transmission in the first cell.

8. The apparatus according to claim 7, wherein the scheduling PTM transmission start notification message of the first cell is an multimedia broadcast multicast service (MBMS) task start message, the MBMS task start message comprises identification information of the first cell.

9. A method, comprising:

receiving, by a user equipment (UE), configuration information of scheduling point to multipoint (PTM) transmission from a base station, wherein the configuration information of the scheduling PTM transmission comprises a radio network temporary identity (RNTI) of the scheduling PTM transmission, a temporary multicast group identity (TMGI) corresponding to the scheduling PTM transmission, and resource configuration information used in the scheduling PTM transmission, wherein the RNTI of the scheduling PTM transmission is used to indicate, to the UE, the RNTI used in the scheduling PTM transmission, the TMGI corresponding to the scheduling PTM transmission is used to indicate a multimedia broadcast multicast service (MBMS) service identifier of RNTI scheduling of the scheduling PTM transmission, and the resource configuration information used in the scheduling PTM transmission comprises subframe and frequency resource configuration information used in the scheduling of the PTM transmission;

receiving, by the UE, the configuration information of the scheduling PTM transmission, and a service list of scheduling PTM transmission of a neighboring cell of the first cell in which the UE is located from the base station, wherein the service list includes PTM transmission service data that is being sent by the neighboring cell; and receiving, by the UE, data from the base station using the subframe and the frequency resource used for the scheduling PTM transmission in the first cell.

10. The method according to claim 9, wherein the receiving of the data comprises:

determining, by the UE, a RNTI used for receiving the data according to the RNTI of the scheduling PTM transmission; and receiving, by the UE, data from the base station by using the subframe and the frequency resource used for the scheduling PTM transmission in the first cell according to the RNTI used for receiving the data.

11. The method according to claim 9, wherein the receiving of the configuration information of the scheduling PTM transmission comprises:

receiving, by the UE, the configuration information of the scheduling PTM transmission, and a service list of scheduling PTM transmission of a neighboring cell of the first cell in which the UE is located from the base station; and determining, by the UE, whether the neighboring cell of the first cell in which the UE is located is sending data for scheduling PTM transmission; and the method further comprises:

in response to the UE moving from the first cell in which the UE is located to the neighboring cell of the first cell in which the UE is located, determining, by the UE according to whether the neighboring cell of the first cell in which the UE is located is sending data for scheduling PTM transmission, to continue to receive data by using scheduling PTM transmission or trigger establishment of a unicast bearer.

12. An apparatus, comprising:

a storage medium including executable instructions; and a processor;

wherein the executable instructions, when executed by the processor, cause the apparatus to:

receive configuration information of scheduling point to multipoint (PTM) transmission from a base station, wherein the configuration information of the scheduling PTM transmission comprises a radio network temporary identity (RNTI) of the scheduling PTM transmission, a temporary multicast group identity (TMGI) corresponding to the scheduling PTM transmission, and resource configuration information used in the scheduling PTM transmission, wherein the RNTI of the scheduling PTM transmission is used to indicate, to the UE, the RNTI used in the scheduling PTM transmission, the TMGI corresponding to the scheduling PTM transmission is used to indicate a multimedia broadcast multicast service (MBMS) service identifier of RNTI scheduling of the scheduling PTM transmission, and the resource configuration information used in the scheduling PTM transmission comprises subframe and frequency resource configuration information used in the scheduling of the PTM transmission;

receive the configuration information of the scheduling PTM transmission, and a service list of scheduling PTM transmission of a neighboring cell of the first cell in which the apparatus is located from the base station, wherein the service list includes PTM transmission service data that is being sent by the neighboring cell; and receive data from the base station using the subframe and the frequency resource used for the scheduling PTM transmission in the first cell.

13. The apparatus according to claim 12, wherein the receiving of the data comprises:
   determining, by the UE, to receive the data from the base station according to the TMGI corresponding to the scheduling PTM transmission;
   determining, by the UE, a RNTI used for receiving the data according to the RNTI of the scheduling PTM transmission; and
   receiving, by the UE, data from the base station by using the subframe and the frequency resource used for the scheduling PTM transmission in the first cell according to the RNTI used for receiving the data.

14. The method according to claim 12, wherein the receiving of the configuration information of the scheduling PTM transmission comprises:
   determining, by the UE, whether the neighboring cell of the first cell in which the UE is located is sending data for scheduling PTM transmission; and
   the method further comprises:
   in response to the UE moving from the first cell in which the UE is located to the neighboring cell of the first cell in which the UE is located, determining, by the UE according to whether the neighboring cell of the first cell in which the UE is located is sending data for scheduling PTM transmission, to continue to receive data by using scheduling PTM transmission or trigger establishment of a unicast bearer.

* * * * *